(12) United States Patent
Sakamoto

(10) Patent No.: US 7,169,203 B2
(45) Date of Patent: Jan. 30, 2007

(54) HONEYCOMB STRUCTURE

(75) Inventor: Hirofumi Sakamoto, Chita-gun (JP)

(73) Assignee: NGK Insulators, Ltd., Nagoya (JP)

( * ) Notice: Subject to any disclaimer, the term of this patent is extended or adjusted under 35 U.S.C. 154(b) by 238 days.

(21) Appl. No.: 10/473,612

(22) PCT Filed: Feb. 5, 2003

(86) PCT No.: PCT/JP03/01161

§ 371 (c)(1),
(2), (4) Date: Oct. 1, 2003

(87) PCT Pub. No.: WO03/067043

PCT Pub. Date: Aug. 14, 2003

(65) Prior Publication Data

US 2004/0128991 A1    Jul. 8, 2004

(30) Foreign Application Priority Data

Feb. 5, 2002  (JP) .............................. 2002-028422

(51) Int. Cl.
*B01D 46/00*  (2006.01)

(52) U.S. Cl. ...................... 55/523; 55/282.2; 55/282.3; 55/385.3; 55/482; 55/484; 55/DIG. 10; 55/DIG. 30; 60/311; 428/116

(58) Field of Classification Search ............... 55/282.2, 55/282.3, 385.3, 482, 484, 523, DIG. 10, 55/DIG. 30; 60/311; 428/116, 117, 118; 165/10
See application file for complete search history.

(56) References Cited

U.S. PATENT DOCUMENTS

| | | | | |
|---|---|---|---|---|
| 3,853,504 A | * | 12/1974 | Buscher et al. | ............... 55/523 |
| 4,304,585 A | * | 12/1981 | Oda et al. | ................... 428/116 |
| 4,335,783 A | | 6/1982 | McBrayer et al. | |
| 4,381,815 A | | 5/1983 | Frost et al. | |
| 5,702,508 A | * | 12/1997 | Moratalla | ..................... 55/523 |

(Continued)

FOREIGN PATENT DOCUMENTS

DE    37 22 707 A1    1/1989

(Continued)

OTHER PUBLICATIONS

Gulati, "Strength and Thermal Shock Resistance of Segmented Wall-Flow Diesel Filters", SAE Technical Paper Series, pp. 11-18.

*Primary Examiner*—Jason M. Greene
(74) *Attorney, Agent, or Firm*—Oliff & Berridge, PLC

(57) ABSTRACT

There is disclosed a honeycomb structure comprising a plurality of honeycomb segments (12), bonded into one piece, having an outer peripheral wall (8), cell walls (2) disposed inside the outer peripheral wall, and a large number of cells (3) partitioned by the cell walls and passing through an axial direction. The honeycomb structure (1) comprises the honeycomb segment (12) in which the cell walls (2) have an angle in a range of 25 to 65 degrees to a straight line along an outermost point of the outer peripheral wall (8a) adjacent to another honeycomb segment, in a vertical section to an X-axis direction of the honeycomb structure (1). The honeycomb structure including the honeycomb segment can be used in a filter for trapping particulate in an exhaust gas of an internal combustion engine, boiler, etc. and can be superior in resistance to cracks by a thermal stress.

18 Claims, 8 Drawing Sheets

U.S. PATENT DOCUMENTS

| | | | |
|---|---|---|---|
| 6,126,833 A * | 10/2000 | Stobbe et al. | 55/523 |
| 6,669,751 B1 * | 12/2003 | Ohno et al. | 55/523 |
| 6,673,414 B1 * | 1/2004 | Ketcham et al. | 428/116 |
| 6,736,870 B1 * | 5/2004 | Best et al. | 55/523 |
| 6,902,599 B1 * | 6/2005 | Bardon | 55/523 |
| 2003/0000188 A1 * | 1/2003 | Harada et al. | 55/523 |
| 2004/0211164 A1 * | 10/2004 | Hamanaka et al. | 55/523 |

FOREIGN PATENT DOCUMENTS

| | | |
|---|---|---|
| EP | 1 101 910 A2 | 5/2001 |
| EP | 1247556 | 10/2002 |
| JP | B2 61-51240 | 11/1986 |
| JP | U 62-163697 | 10/1987 |
| JP | A 6-47620 | 6/1994 |
| JP | A 8-28246 | 1/1996 |
| JP | A 11/114338 | 4/1999 |
| JP | 2000-192608 | 7/2000 |
| KR | 2001-80690 | 8/2001 |
| WO | WO 01/51174 | 7/2001 |

* cited by examiner

HONEYCOMB STRUCTURE

TECHNICAL FIELD

The present invention relates to a honeycomb structure for use in a filter for trapping particulate in exhaust gas from an internal combustion engine, a boiler, and the like, particularly to a honeycomb structure which is superior in resistance to cracks by a thermal stress.

BACKGROUND ART

A honeycomb structure has been used in a filter for trapping particulate in exhaust gas of an internal combustion engine, boiler, and the like, particularly diesel particulate.

In general, as shown in FIGS. 9(a) and (b), the honeycomb structure for use in this purpose has a large number of cells 3 which are partitioned from one another by partition walls 2 and which extending through an X-axis direction, and has a structure in which the cells 3 adjacent to each other are plugged in one end on an opposite side so that end faces have checkered patterns. In such a honeycomb structure, a fluid to be treated flows in the cell 3 not plugged at inflow end face 42, that is, plugged at outflow end face 44, passes through the porous cell walls 2, and is discharged via the adjacent cells 3, that is, the cell 3 plugged at the inflow end face 42 and not plugged at outflow end face 44. In this case, the cell walls 2 act as a filter. For example, soot discharged from a diesel engine is trapped by the cell walls and deposited on the cell walls. In the honeycomb structure used for such way, the rapid temperature change of exhaust gas and the local heating makes non-uniform the temperature distribution inside the honeycomb structure, and there have been problems such as crack generation by thermal stress in honeycomb structure and the like. When the honeycomb structure is used particularly as a filter for trapping a particulate substance in an exhaust gas emitted from a diesel engine (it is hereinafter referred to as DPF), it is necessary to burn the fine carbon particles deposited on the filter to remove the particles and regenerate the filter and, in that case, high temperatures are inevitably generated locally in the filter; as a result, by nonuniformity of regeneration temperature, a large thermal stress and cracks have tended to generate.

To solve the problem, a method of bonding a plurality of divided segments of the honeycomb structure by a bond material has been proposed. For example, in U.S. Pat. No. 4,335,783, a method for manufacturing a honeycomb structure is disclosed in which a large number of honeycomb members are bonded by discontinuous bond materials. Also in JP-B-61-51240 is proposed a thermal-shock resistant rotary regenerating thermal exchanging method which comprises forming, by extrusion, matrix segments of honeycomb structure made of a ceramic material, firing them, making smooth, by processing, the outer peripheral portions of the fired segments, coating the to-be-bonded areas of the resulting segments with a ceramic adhesive having, when fired, substantially the same chemical composition as the matrix segments and showing a difference in thermal expansion coefficient, of 0.1% or less at 800° C., and firing the coated segments. In SAE document 860008 of 1986, a ceramic honeycomb structure is disclosed in which the honeycomb segment of cordierite is similarly bonded with cordierite cement. Further in JP-A-8-28246 is disclosed a ceramic honeycomb structure obtained by bonding honeycomb ceramic members with an elastic sealant made of at least a three-dimensionally intertwined inorganic fiber, an inorganic binder, an organic binder and inorganic particles. Attempts have also been made to prepare the honeycomb structure using silicon carbide based materials high in thermal conductivity and heat resistance so that a local high temperature is prevented and the honeycomb structure is prevented from being broken by the thermal stress.

By this segmenting, and/or by the use of the materials high in heat resistance, such as the silicon carbide based material, the cracks by the thermal stress can be reduced to some degree. However, when the resistance to the thermal stress of the segment itself can further be enhanced, cost can be reduced by decrease of the number of segments, and regeneration efficiency can also be enhanced.

DISCLOSURE OF THE INVENTION

The present invention has been developed in consideration of this situation, and an object thereof is to provide a honeycomb structure including honeycomb segments superior in resistance to cracks by thermal stress.

As a result of intensive studies on the above-described problem, it was found that the honeycomb structure is cracked by concentration of the stress onto corner portions of cells, that is, intersections of cell walls, and that by changing angles of the cells, that is, angles of the cell walls, the concentration of the stress can be reduced and stress reduction and enhancement of the resistance to the stress can be achieved.

According to the present invention, based on the above-described findings, there is provided a honeycomb structure comprising a plurality of honeycomb segments bonded into one piece, each segment having an outer peripheral wall, cell walls disposed inside the outer peripheral wall, and a large number of cells partitioned from one another by the cell walls and passing through an axial direction, wherein in a vertical section to the axial direction of the honeycomb structure, the honeycomb structure comprises the honeycomb segment whose cell wall has an angle in a range of 25 to 65 degrees to a straight line along an outermost point of the outer peripheral wall adjacent to another honeycomb segment.

In the present invention, a shape of the cell in the section of the honeycomb segment is preferably quadrangular shape, and at least one of the honeycomb segments disposed in a central portion of the honeycomb structure is preferably the honeycomb segment whose cell wall has the angle in a range of 25 to 65 degrees. A major component of the honeycomb segment is preferably silicon carbide or a silicon/silicon carbide composite material, and 70% by volume or more of the honeycomb structure is preferably constituted of the honeycomb segment having an sectional area of 900 mm$^2$ to 10000 mm$^2$ in the section of the honeycomb segment. It is preferable that openings of predetermined cells in the honeycomb segments are plugged in one end face, and the openings of a part of remaining cells are plugged in the other end face. It is also preferable that the openings of the predetermined cells in the honeycomb segments are plugged in one end face, and the openings of all the remaining cells are plugged in the other end face.

BRIEF DESCRIPTION OF THE DRAWINGS

FIG. 1(a) is a schematic perspective view of a honeycomb segment, FIG. 1(b) is a schematic sectional view of the honeycomb segment, FIG. 1(c) is a schematic perspective view of the honeycomb structure, and FIG. 1(d) is a schematic sectional view of the honeycomb structure;

FIG. 9(a) is a schematic perspective view.

FIG. 10(a) is a schematic perspective view of the honeycomb segment, FIG. 10(b) is a schematic sectional view of the honeycomb segment, and FIG. 10(c) is a schematic perspective view of the honeycomb structure.

BEST MODE FOR CARRYING OUT THE INVENTION

A honeycomb structure and a method for manufacturing the honeycomb structure of the present invention will be described hereinafter in detail with reference to the drawings, but the present invention is not limited to the following embodiments. It is to be noted that in the following a section means a vertical section with respect to an X-axis direction (longitudinal direction of a cell) unless otherwise noted.

Figure 1A:
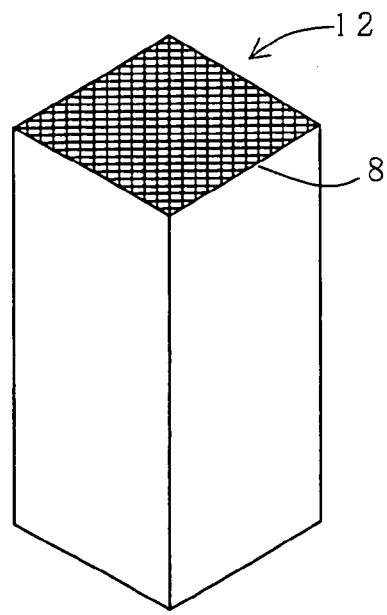
FIGS. 1(a) to (d) are schematic diagrams showing one embodiment of a honeycomb structure of the present invention.

As shown in FIGS. 1(a), (b), (c), and (d), the honeycomb structure of the present invention comprises a plurality of honeycomb segments 12 bonding into each piece. The honeycomb segment has an outer peripheral wall 8, cell walls 2 disposed inside the outer peripheral wall 8, and a large number of cells 3 partitioned from one another by the cell walls 2 and passed through an axial direction. An important characteristics of the present invention is that, as shown in FIGS. 1(b) and (d), the honeycomb structure comprises the honeycomb segment whose cell wall 2 has an angle (hereinafter referred to as an inclination angle) "a" and/or "b" in a range of 25 to 65 degrees with respect to a straight line (hereinafter referred to as an outer peripheral line) along an outermost point of an outer peripheral wall 8a adjacent to another honeycomb segment in a section of a honeycomb structure 1.

Figure 10A:
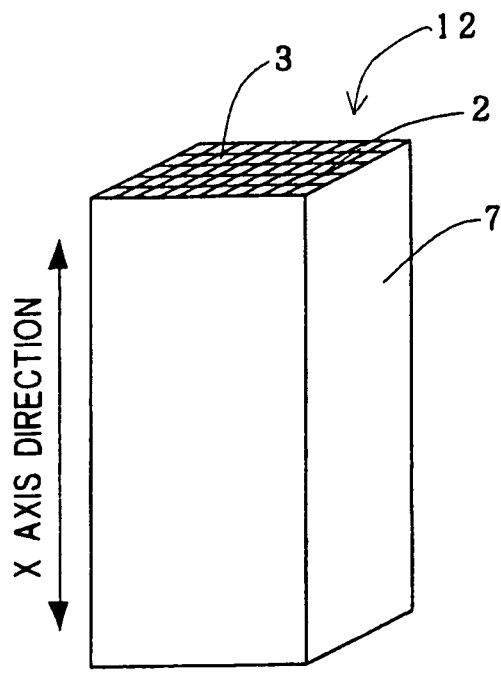
FIGS. 10(a) to (c) are schematic views showing a conventional honeycomb segment structure.
Figure 10B:
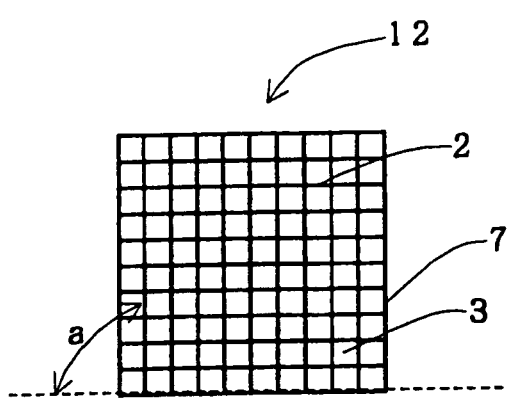
Figure 10C:
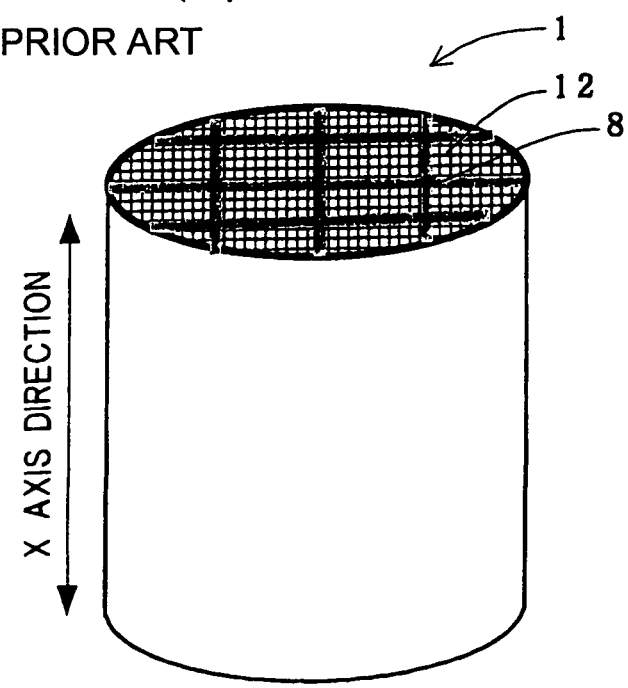
Figure 11A:
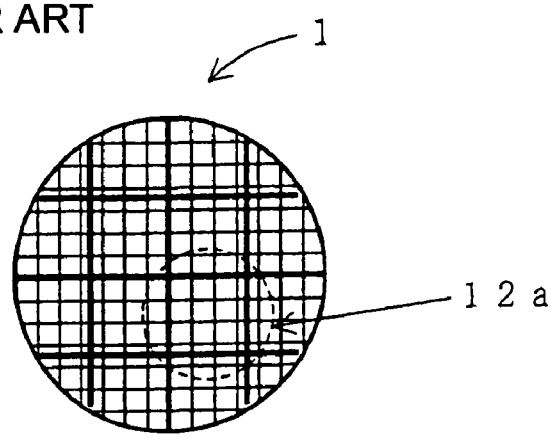
FIG. 11(a) is a schematic sectional view showing the conventional honeycomb structure.
Figure 11B:
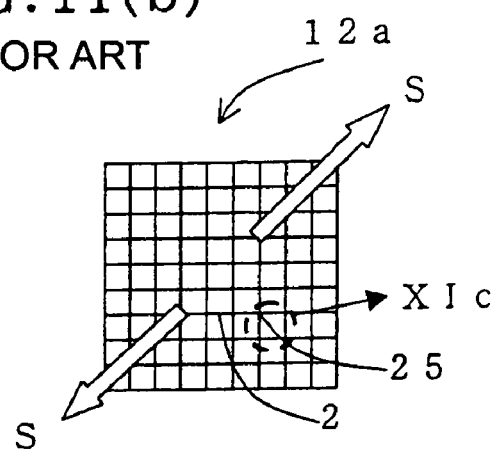
FIG. 11(b) is a sectional view of the honeycomb segment constituting FIG. 11(a)
Figure 11C:
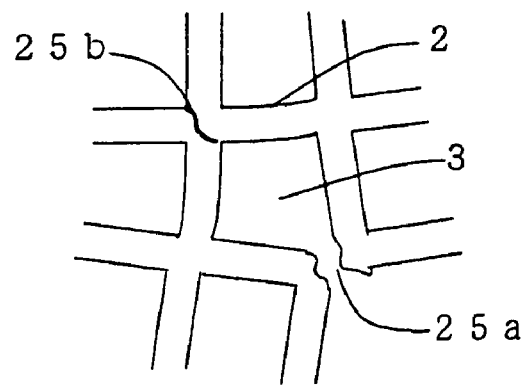
FIG. 11(c) is an enlarged view of the part XIc in FIG. 11(b).

As shown in FIGS. 10(a) and (b), the conventional honeycomb segment has the inclination angle "a" of 90 degrees or 180 degrees (parallel), and usually a quadrangular section is a basic shape. The honeycomb segments are bonded into one piece to form the honeycomb structure as shown in FIG. 10(c). With the use of such a honeycomb structure, for example, in DPF, when particulate matter (PM) trapped by the DPF are burned for regeneration by an exhaust gas from an engine at a high temperature, because of characteristics of fluid, much exhaust gas flows in a central portion of the DPF, and therefore the regeneration also actively occurs in the central portion of the DPF. Therefore, the central portion of the DPF is easily at the high temperature, an outer peripheral portion is easily at a low temperature, and a temperature difference is easily generated radially from the central portion of the DPF. Therefore, the central portion of the DPF tends to expand rather than the outer peripheral portion, and the stress is applied, for example, to a honeycomb segment 12a in an arrow S direction in FIG. 11(a). As a result, the stress is concentrated on intersections 25 of the cell walls 2, and as shown in FIG. 11(c), for example, an intersection 25a of the cell wall is easily cracked. Furthermore, because of the crack, once generated, makes the stress concentrated on an intersection 25b positioned in a diagonal direction of the cell wall. Therefore, there is a disadvantage that the crack is easily developed.

Figure 1B:
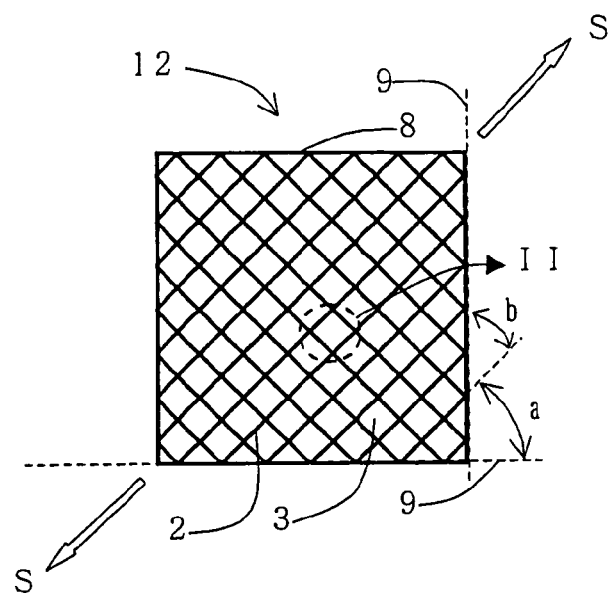
Figure 2:
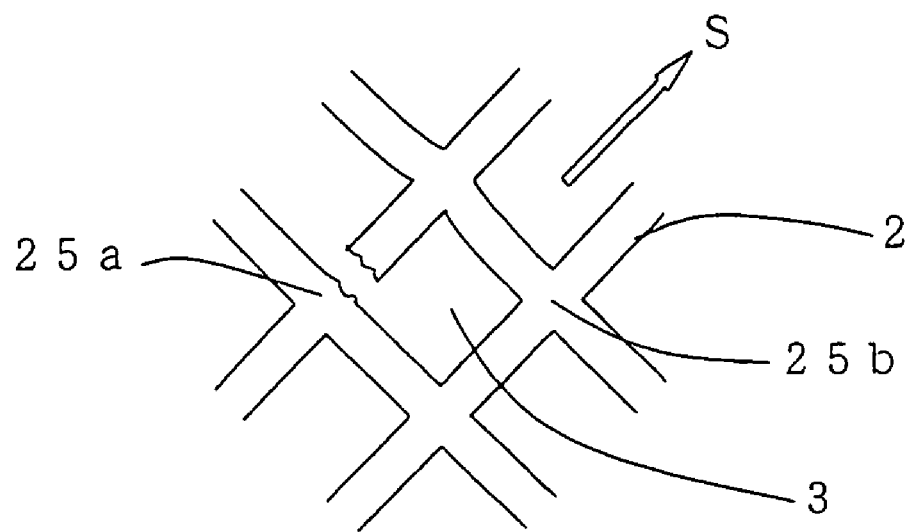
FIG. 2 is an enlarged view of the part II in FIG. 1.

On the other hand, the honeycomb structure of the present invention comprises a honeycomb segment whose inclination angle "a" is in a range of 25 to 65 degrees, for example, a honeycomb segment whose inclination angles "a" and "b" are 45 degrees as shown in FIG. 1(b). Therefore, when a stress S is added as described above, as shown in FIG. 2, the stress is not easily concentrated on the intersection 25 of the cell wall structurally. Even if the intersection 25a is cracked, the stress concentration onto the adjacent intersection 25b is prevented, and the crack is not easily developed.

Figure 1C:
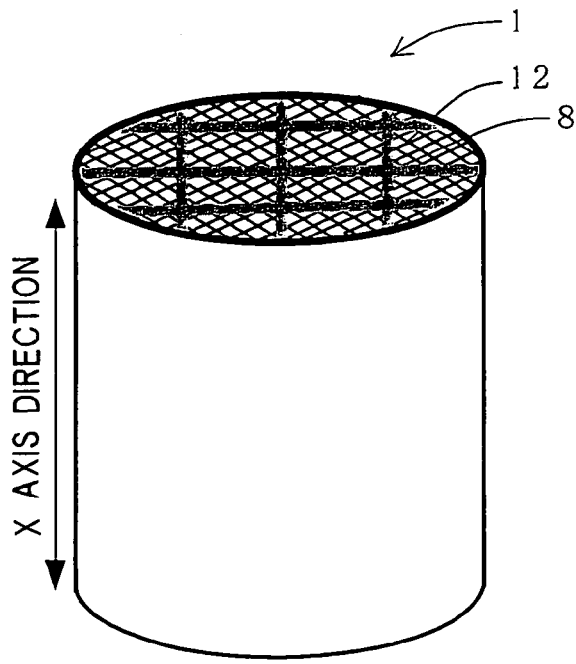
Figure 1D:
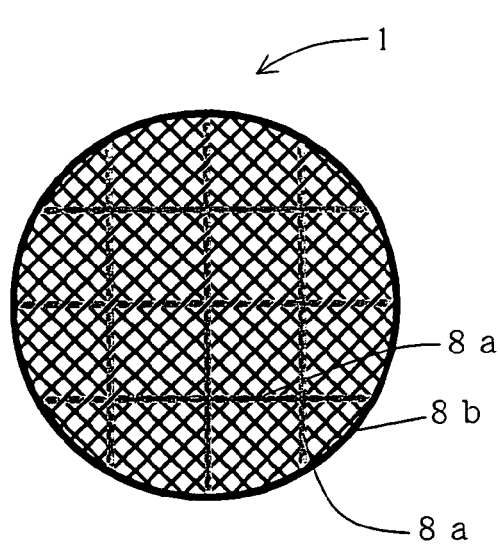

In the present invention, an outer peripheral line 9 means a straight line extending along the outer peripheral wall 8, when an outer peripheral shape in the section of the honeycomb segment is a polygonal shape including the straight line and salient angle (angle less than 180 degrees) as an inner angle, such as a quadrangular shape shown in FIG. 1(b). It is to be noted that the line on an outer peripheral wall 8b not adjacent to another honeycomb segment as shown in FIG. 1(d) is not included. When the outer peripheral shape of the section of the honeycomb segment is not the general polygonal shape described above, and is a polygonal shape including a reentering angle (angle larger than 180 degrees) as the inner angle, for example, as shown in FIG. 3, the outer peripheral line 9 means a straight line extending to connect vertexes to one another outside the honeycomb segment.

Moreover, two angles which are mutual supplementary angles are formed in the intersection of the outer peripheral line 9 and the straight line along the cell wall 2, but the inclination angle (angle of the cell wall 2 with respect to the outer peripheral line 9) means an acute angle formed in the intersection of the outer peripheral line 9 and the straight line extending along the cell wall 2.

Figure 3:
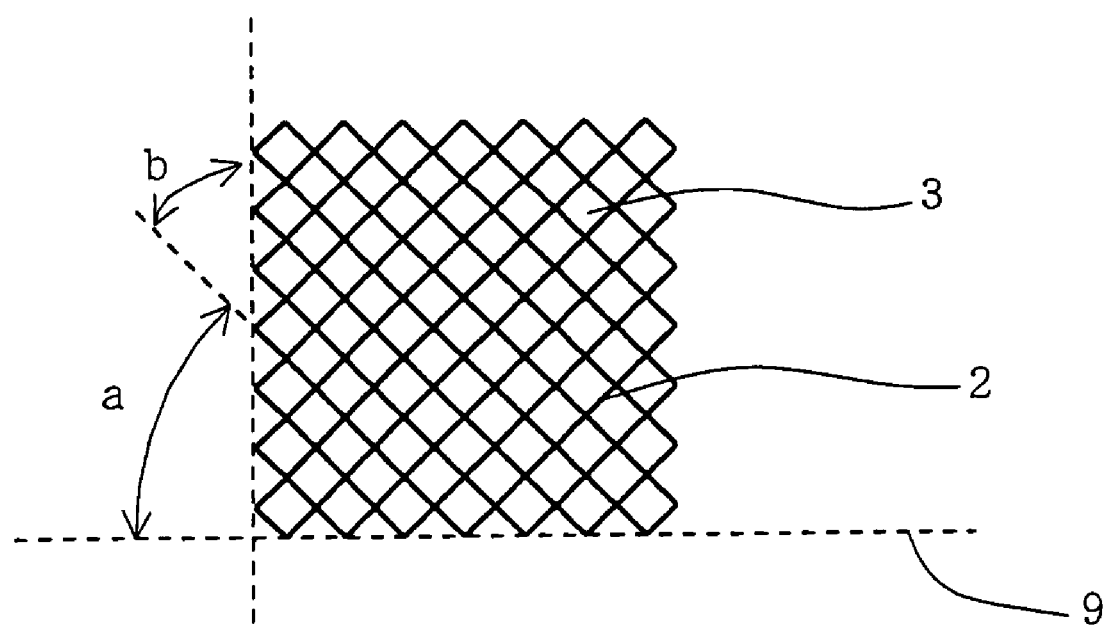
FIG. 3 is a schematic sectional view showing another embodiment of the honeycomb segment in the present invention.

In the present invention, as in the honeycomb segment shown in FIG. 1(b) or 3, when the inclination angles "a" and "b" are 45 degrees, the segment is most effective. When the inclination angle is in a range of 25 to 65 degrees, a satisfactory improvement effect is obtained. In a range of 30 to 60 degrees, further satisfactory improvement effect is obtained. In a range of 35 to 55 degrees, an improvement effect substantially equal to that with 45 degrees is obtained.

Figure 4:
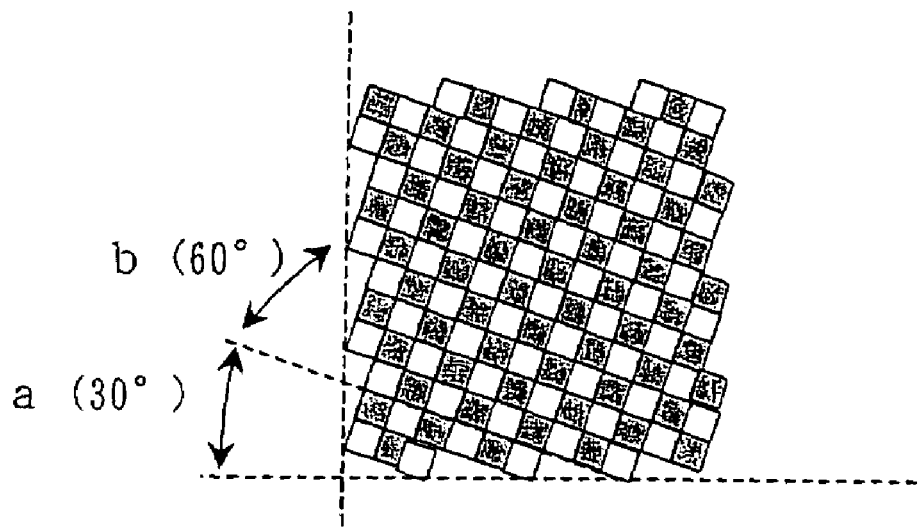
FIG. 4 is a schematic plan view showing still another embodiment of the honeycomb segment in the present invention.
Figure 5:
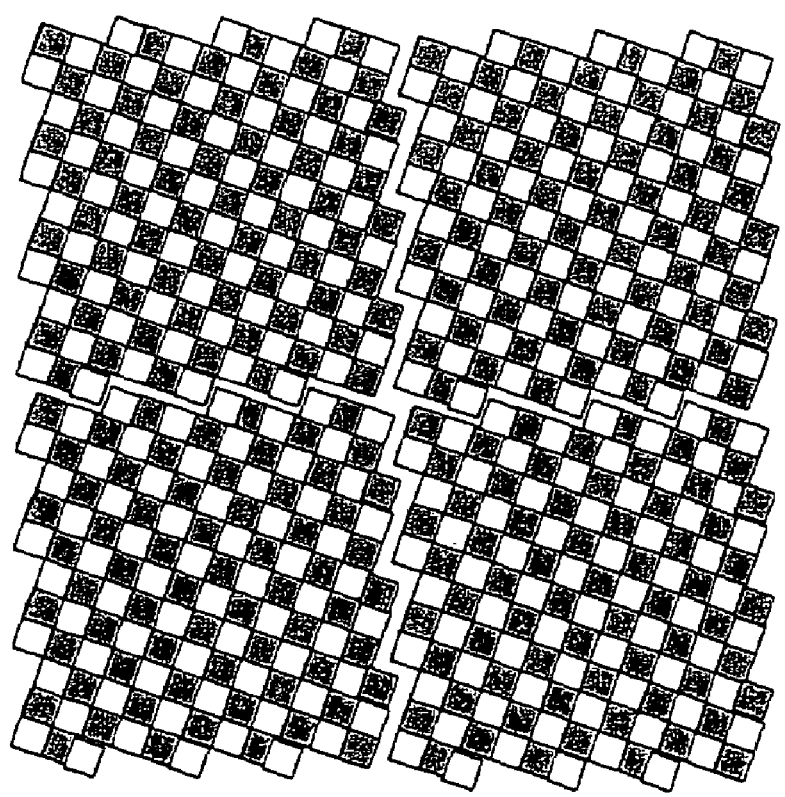
FIG. 5 is a schematic plan view showing the honeycomb structure comprising the honeycomb segment of FIG. 4.

FIG. 4 shows the honeycomb segment whose inclination angles "a" and "b" are 30 degree and 60 degree, respectively, according to another embodiment of the honeycomb segment of the present invention, and FIG. 5 shows a bonding pattern of the honeycomb segment shown in FIG. 4. Even in this embodiment, the effect of the present invention can be obtained. With the polygonal honeycomb segment including the outer peripheral shape which has the reentering angle as shown in FIGS. 3 and 4, there is an advantage that positioning can be easily carried out at the time of bonding as shown in FIG. 5.

Figure 6:
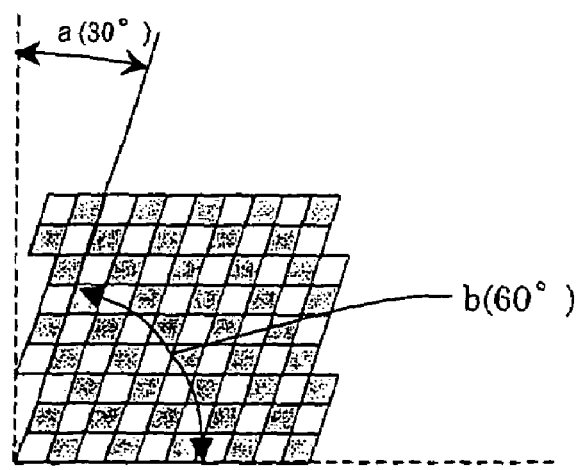
FIG. 6 is a schematic plan view showing still another embodiment of the honeycomb segment in the present invention.

FIG. 6 shows another embodiment of the honeycomb segment in which the inclination angles "a" and "b" are 30 degree and 60 degree, respectively. For the honeycomb segment shown in FIG. 6, the intersection of the cell walls does not have right angle, but the effect of the present invention is obtained even in this embodiment. For the honeycomb structure shown in FIGS. 4 to 6, an opening of a predetermined cell is plugged in one end face, and the opening of a predetermined remaining cell is plugged in the other end face. By this plugging, a larger filtering area can be secured. In this case, the predetermined remaining cell means a part of the remaining cells. That is, there may be a cell which is not plugged in either end face. However it is preferred that the predetermined remaining cells are all of the remaining cells. That is, each opening of all the cells is preferably plugged in either end face, because a largest filtering area can be secured.

In the present invention, the honeycomb segment which has the inclination angle in a range of 25 to 65 degrees means a honeycomb segment in which the cell walls including the inclination angles in a range of 25 to 65 degrees with respect to any outer peripheral line occupy 50% by volume or more, preferably 70% by volume or more, further preferably 90% by volume or more, most preferably 95% by volume or more with respect to all the cell walls. Furthermore, the cell walls including the inclination angles in a range of 25 to 65 degrees with respect to all the outer peripheral lines preferably occupy 50% by volume or more, further preferably 70% by volume or more, even further preferably 90% by volume or more, most preferably 95% by volume or more with respect to all the cell walls. The cell wall preferably has a plate shape with a thickness in a range of preferably 30 to 2000 µm, further preferably 40 to 1000 µm, most preferably 50 to 500 µm. The sectional shape preferably has linearity to such a degree that the straight line can be drawn along the section in a division in at least one cell is formed.

Moreover, the sectional shape of the cell formed by the cell wall is preferably a polygonal shape, especially preferably a quadrangular shape. When the sectional shape of the cell is the quadrangular shape, the cell wall can linearly be continued from one outer peripheral wall to the other outer peripheral wall, and the inclination angle can be constant.

Figure 7:
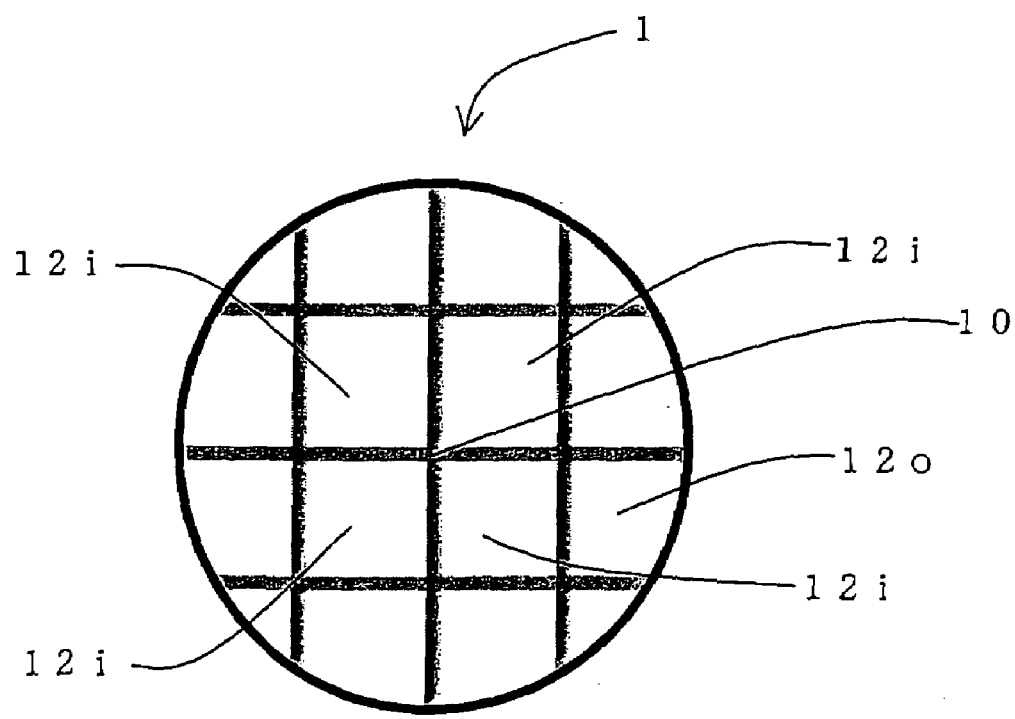
FIG. 7 is a schematic plan view showing still another embodiment of the honeycomb structure in the present invention.

In the present invention, when the honeycomb structure includes at least one honeycomb segment having the inclination angle in a range of 25 to 65 degrees, the improvement effect can be anticipated to some degree. The honeycomb segment having the inclination angle in a range of 25 to 65 degrees is preferably disposed in the central portion in the section of the honeycomb structure. Since the central portion of the honeycomb structure is easily at the high temperature as described above, the central portion is most susceptible to the stress by thermal expansion. Therefore, when the honeycomb segment having the inclination angle in a range of 25 to 65 degrees is disposed in the central portion, resistance to the thermal stress of the whole honeycomb structure can effectively be improved. Here, the honeycomb segment disposed in the central portion in the section of the honeycomb structure (hereinafter referred to as the central portion) means honeycomb segment 12$i$ including a sectional center 10 of the honeycomb structure 1 or disposed adjacent to the sectional center 10 as shown in FIG. 7. Therefore, in the honeycomb structure shown in FIG. 7, four honeycomb segments 12$i$ disposed adjacent to the sectional center 10 are the honeycomb segments disposed in the central portion.

At least one, further preferably two or more, most preferably all of the honeycomb segments disposed in the central portion are preferably honeycomb segments each of which has the inclination angle in the range of 25 to 65 degrees. Furthermore, the honeycomb segment disposed on an outer peripheral side of the honeycomb structure such as a honeycomb segment 12$o$ in FIG. 7 is preferably a honeycomb segment which has the inclination angle in the range of 25 to 65 degrees. All of the honeycomb segments are most preferably honeycomb segments each of which has the inclination angle in the range of 25 to 65 degrees.

In the present invention, from viewpoints of strength, heat resistance, and the like, the major component of the honeycomb structure preferably includes at least one material selected from a group consisting of: cordierite, mullite, alumina, spinel, silicon carbide, silicon carbide/cordierite based composite material, silicon/silicon carbide based composite material, silicon nitride, lithium aluminum silicate, aluminum titanate, Fe—Cr—Al based metal, and a combination thereof. Silicon carbide or silicon/silicon carbide based composite material is especially suitable for the major component of the honeycomb structure of the present invention, because the material is in the following thermal conductivity range, and is high in thermal conductivity. Here, it is meant that the "major component" constitutes 50% by mass or more, preferably 70% by mass or more, further preferably 80% by mass or more of the honeycomb structure. In the present invention, for the honeycomb structure 1 formed of metal silicon (Si) and silicon carbide (SiC), when an Si content defined by Si/(Si+SiC) is excessively small, an effect of Si addition cannot be obtained. When the Si content exceeds 50% by mass, the effects of characteristics of SiC such as heat resistance and high thermal conductivity cannot be obtained. The Si content is preferably 5 to 50% by mass, further preferably 10 to 40% by mass.

Moreover, the material for plugging the opening of the cell is preferably one or more materials selected from ceramic or metal described above which can preferably be used in the honeycomb structure, and is more preferably the same material as the major component of the honeycomb structure.

In the present invention, the thermal conductivity of the honeycomb structure is not especially limited. However, when the thermal conductivity is excessively high, heat is excessively released, the temperature does not sufficiently rise at the regeneration, and regeneration efficiency disadvantageously drops. When the thermal conductivity is excessively low, local high temperature is caused at the time of regeneration. There is a problem that the crack by a large thermal stress is further easily generated. The thermal conductivity of the honeycomb structure is preferably 10 to 60 W/mK, further preferably 20 to 55 W/mK, most preferably 25 to 50 W/mK at 40° C.

A size of the honeycomb segment in the honeycomb structure of the present invention is not limited. However, when each segment is excessively large, a problem of breakage by the thermal stress easily occurs. When each segment is excessively small, the manufacturing or the bonding of each segment is disadvantageously intricate. For the preferable size of the honeycomb segment, a sectional area is 900 $mm^2$ to 10000 $mm^2$, further preferably 950 $mm^2$ to 5000 $mm^2$, most preferably 1000 $mm^2$ to 3500 $mm^2$. The honeycomb segments having this size preferably constitute 70% by volume or more of the honeycomb structure. The shape of the honeycomb segment is not especially limited, but the sectional shape is preferably the quadrangular shape as shown in FIGS. 1(a), (b). The shape of the honeycomb segment on the outer peripheral side of the honeycomb structure can appropriately be selected so as to match a shape of an integrated honeycomb structure as shown in FIGS. 1(c), (d), but a sectional shape in which at least two sides are straight lines crossing at right angles to each other is preferable.

In the present invention, a cell density (the number of cells per unit sectional area) of the honeycomb segment is not especially limited. When the cell density is excessively small, strength and effective geometric surface area (GSA) of the honeycomb structure become insufficient. When the cell density is excessively large, a pressure loss increases when a fluid to be treated flows. The cell density is in a range of preferably 6 to 2000 cells/square inch (0.9 to 311 cells/$cm^2$), further preferably 50 to 1000 cells/square inch (7.8 to 155 cells/$cm^2$), most preferably 100 to 400 cells/square inch (15.5 to 62.0 cells/$cm^2$).

The honeycomb structure of the present invention is constituted of a plurality of integrated honeycomb segments. In this case, the segments can be integrated using a bonding material. A preferable bonding material can be selected from the materials for use preferably as the major component of the honeycomb structure described above. When a difference of a thermal expansion coefficient between the bonding material and honeycomb segment is excessively large, the thermal stress is undesirably concentrated on the bonded portion at a heating/cooling time. The difference of the thermal expansion coefficient between the bonding material and the honeycomb segment at 20° C. to 800° C. is preferably $1\times10^{-6}$/° C. or less.

When the honeycomb structure of the present invention is to be used as a catalyst substrate for purifying the exhaust gas of thermal engines such as an internal combustion engine or combustion apparatuses such as a boiler, or for modifying a liquid or gas fuel, a catalyst such as a metal having a catalytic capability is preferably loaded on the honeycomb structure of the present invention. Examples of a typical metal having the catalytic capability include Pt, Pd, Rh, and at least one of these is preferably loaded on the honeycomb structure.

Next, a method for manufacturing the honeycomb structure of the present invention will be described.

As a raw material powder of the honeycomb structure, the above-described preferable materials such as a silicon carbide powder are used. To the powder, binders such as methyl cellulose and hydroxypropoxyl methyl cellulose are added. Further a surfactant and water are added to prepare puddle having plasticity. When the puddle is extrusion molded, a die which can form a honeycomb segment according to the present invention, that is, the honeycomb segment having the inclination angle of 25 to 65 degrees can be used. By using the die, the honeycomb segment having a predetermined shape can be obtained.

The segment is dried, for example, by microwave and hot air. Thereafter, the cells 3 are plugged at one end alternately, with a material similar to that for use in manufacturing the honeycomb structure, so that the end faces have checkered patterns. The segment was dried further, then heated and degreased in, for example, an $N_2$ atmosphere, and fired in for example an Ar inert atmosphere, so that the honeycomb segment according to the present invention can be obtained. The segment can also be obtained by cutting or grinding an outer periphery of the conventional honeycomb segment shown in FIG. 10(a). The segments obtained in such a manner can be bonded using, for example, ceramic cement, and thereafter dried and hardened, for example, at 200° C., to obtain the honeycomb structure of the present invention.

For the honeycomb structure manufactured in such a manner, A method for loading a catalyst may be a method usually carried out by a person skilled in the art. For example, the catalyst can be loaded on the structure by wash coating of the catalyst slurry, subsequently drying and firing.

Hereinafter, the present invention is specifically described by way of Examples. However, the present invention is in no way restricted by these Examples.

COMPARATIVE EXAMPLE 1

As a raw material, a mixed powder containing 75% by mass of SiC powder and 25% by mass of metal Si powder was used. To the powder, methyl cellulose, hydroxypropoxyl methyl cellulose, surfactant, and water were added to prepare the puddle having plasticity. The puddle was extrusion-molded, and dried by microwave and hot air to obtain the honeycomb segment having cells of square sectional shape, the inclination angle of 0 degree and 90 degrees, porosity of 43%, average pore diameter of about 10 μm, cell wall thickness of about 300 μm (12 mil), and cell density of about 47 cells/$cm^2$ (300 cells/square inch) as shown in FIG. 10(a). The cells of the segment were plugged at one end alternately with the same material as used in the production of the honeycomb structure, so that the end faces had the checkered patterns. The segment was dried further, then heated and degreased in an $N_2$ atmosphere at about 400° C., and fired in an Ar inert atmosphere at about 1550° C., to obtain the honeycomb segment of Si bonded SiC. The segments were bonded using a mixture containing an aluminosilicate material, silicon carbide powder, silica gel, and organic and inorganic binders, dried and hardened at 200° C., and cut to obtain the cylindrical honeycomb structure A being 144 mm in diameter and 152 mm in length.

COMPARATIVE EXAMPLES 2 TO 5 AND EXAMPLES 1 TO 5

Similarly the honeycomb structures B to E whose inclination angles "a" were set to 5, 10, 15, 20 degrees, respectively, were prepared as Comparative Examples 2 to 5, and the honeycomb structures F to J whose inclination angles were set to 25, 30, 35, 40, 45 degrees, respectively, were prepared as Examples 1 to 5. It is to be noted that for the inclination angle "a" other than 45 degrees, two inclination angles "a" and "b" are formed, but a relation is (inclination angle) "b"=(90−(inclination angle "a")). The structure having the inclination angle "a" of 45 to 90 degrees is geometrically the same as that having the inclination angle of 45 to 0 degree.

(Measurement of Maximum Stress)

To each of the obtained honeycomb structures A to J, 31 thermocouples were attached to obtain a state in which an inner temperature distribution can exactly be measured. The structure was installed to an exhaust line of a 2L direct injection diesel engine having a turbo inter cooler, the engine was operated using a diesel oil containing 30 ppm of a Ce fuel additive produced by Rhodea Co, and 6 g/L of soot was accumulated in a filter. Thereafter, the engine exhaust gas temperature in the inlet of DPF was raised at 600° C. to burn the soot. At this time, the temperature distribution in the honeycomb structure was measured. The maximum stress in each honeycomb segment was calculated based on the measured temperature distribution by finite element method, and a relation between the inclination angle and the maximum stress was shown in FIG. 8.

Figure 8:
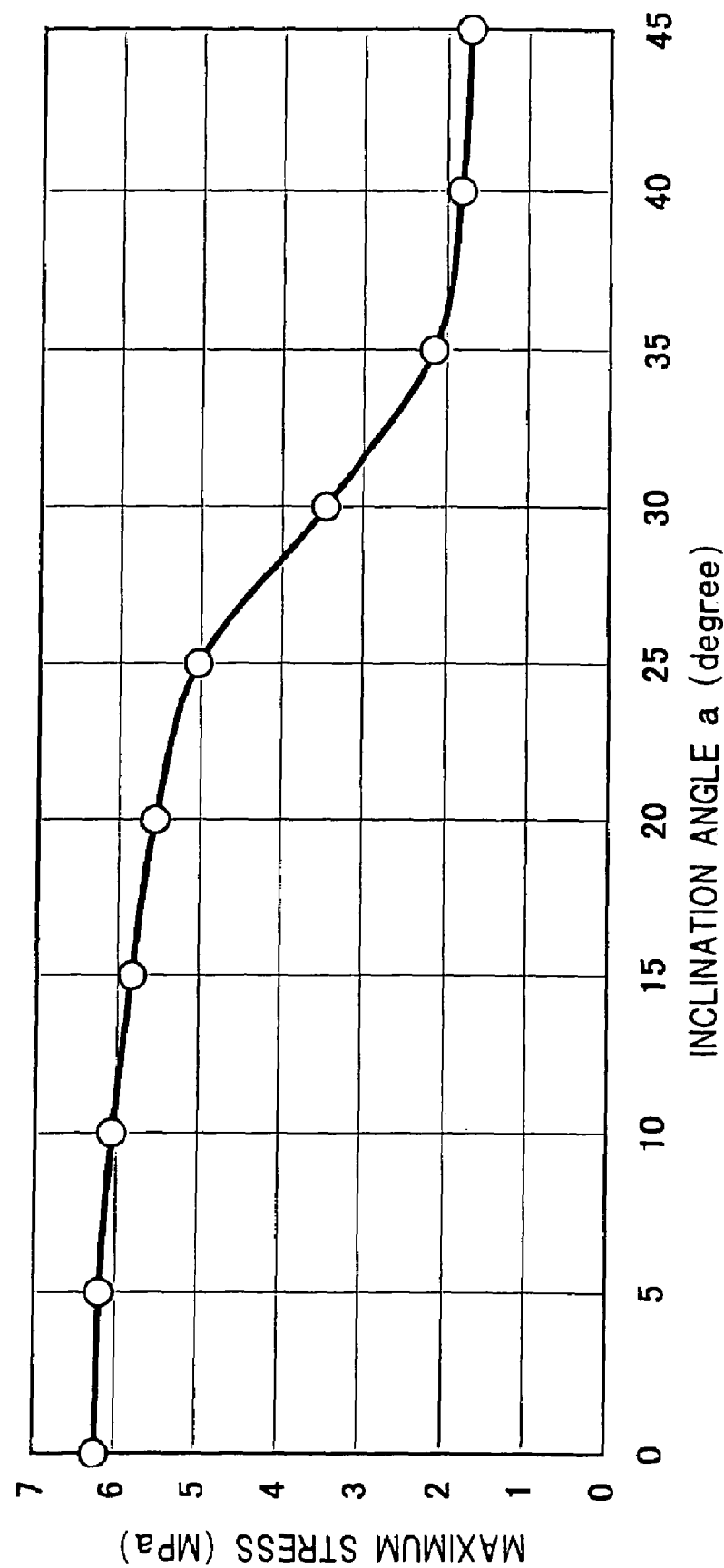
FIG. 8 is a graph showing a relation between an inclination angle and a maximum stress at a time of regeneration of the honeycomb structure obtained in Examples and Comparative Examples.
Figure 9A:
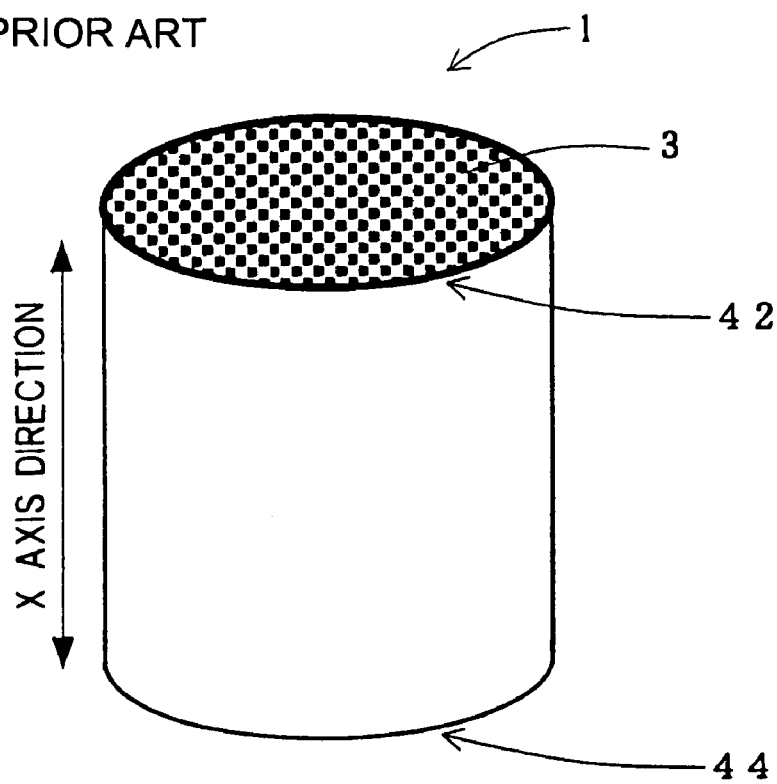
FIGS. 9(a), (b) are schematic views showing a conventional honeycomb structure.
Figure 9B:
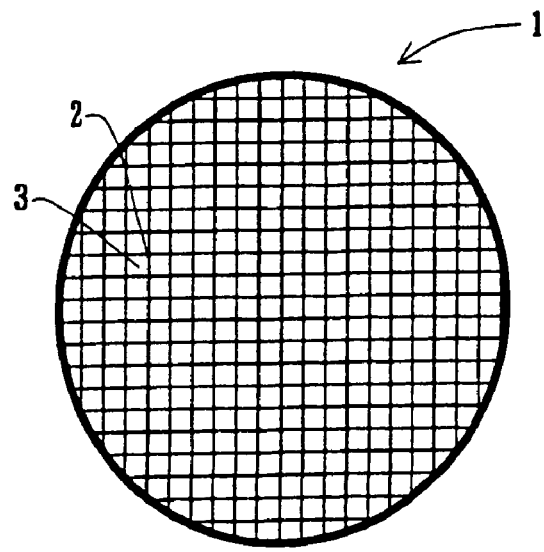
FIG. 9(b) is a schematic plan view.

It is seen from FIG. 8 that the maximum stress rapidly decreases from the point that inclination angle "a" is 25 degrees and that the effect of the present invention is remarkably exhibited at the inclination angle "a" in a range of 25 to 45 degrees. Therefore, it is also seen that including a region with the inclination angle of 45 to 65 degrees, which is geometrically the same as that with the inclination angle of 25 to 45 degrees, the effect of the present invention is remarkably developed in the region with the inclination angle of 25 to 65 degrees.

(Measurement of Critical Soot Amount)

A burning test of the soot was carried out in the same manner as described above. As a first step, an amount of soot to be accumulated in the filter was set to be 4 g/L. Burning of accumulated soot for regeneration and microscope observation after the regeneration were carried out. When no crack was recognized in the end face of the honeycomb structure, it was considered as OK. When the cracks were recognized, it was considered as NG. An amount of soot accumulated was increased in steps of 2 g/L. This test was repeated, and the result was shown in Table 1. As shown in Table 1, the honeycomb structures F to J of the present invention indicated a very satisfactory resistance to the cracks.

along an outermost point of the outer peripheral wall adjacent to another honeycomb segment, wherein the another honeycomb segment has cell walls having an angle in a range of 25 to 65 degrees to a straight line along an outermost point of the outer peripheral wall of the honeycomb segment adjacent to the another honeycomb segment, wherein outermost peripheral walls are formed from a plurality of honeycomb segments having outer peripheral walls that do not make a straight line along an outermost point of the outer peripheral wall, and wherein the honeycomb segment and the another honeycomb segment are each located in a central portion of the honeycomb structure, and are each substantially quadrangular in shape.

2. The honeycomb structure according to claim 1, wherein a shape of the cell in the vertical section of the honeycomb structure is quadrangular shape.

3. The honeycomb structure according to claim 1, wherein a major component of the honeycomb segment is silicon carbide or a silicon/silicon carbide composite material.

4. The honeycomb structure according to claim 2, wherein a major component of the honeycomb segment is silicon carbide or a silicon/silicon carbide composite material.

5. The honeycomb structure according to claim 1, wherein 70% by volume or more of the honeycomb structure is

TABLE 1

|  | Comparative example 1 | Comparative example 2 | Comparative example 3 | Comparative example 4 | Comparative example 5 | Example 1 | Example 2 | Example 3 | Example 4 | Example 5 |
|---|---|---|---|---|---|---|---|---|---|---|
| Honeycomb structure | A | B | C | D | E | F | G | H | I | J |
| Inclination angle a accumulated soot amount | 0° | 5° | 10° | 15° | 20° | 25° | 30° | 35° | 40° | 45° |
| 4 g/L | OK | OK | OK | OK | OK | OK | OK | OK | OK | OK |
| 6 g/L | NG | NG | NG | NG | OK | OK | OK | OK | OK | OK |
| 8 g/L | NG | NG | NG | NG | NG | OK | OK | OK | OK | OK |
| 10 g/L | NG | NG | NG | NG | NG | NG | OK | OK | OK | OK |
| 12 g/L | NG | NG | NG | NG | NG | NG | NG | OK | OK | OK |

INDUSTRIAL APPLICABILITY

As described above, since a honeycomb structure of the present invention includes a honeycomb segment having an inclination angle in a range of 25 to 65 degrees, the structure indicates a satisfactory resistance to a thermal stress. Therefore, the honeycomb structure of the present invention is useful as a honeycomb structure for use in, for example, a filter for capturing exhaust gas of an internal combustion engine, boiler.

The invention claimed is:

1. A honeycomb structure comprising a plurality of honeycomb segments bonded into one piece, each segment having an outer peripheral wall, cell walls disposed inside the outer peripheral wall, and a large number of cells partitioned from one another by the cell walls and passing through an axial direction, wherein in a vertical section to the axial direction of the honeycomb structure, the honeycomb structure comprises the honeycomb segment whose cell walls have an angle in a range of 25 to 65 degrees to a straight line constituted of the honeycomb segment having a sectional area of 900 mm$^2$ to 10000 mm$^2$ in the section of the honeycomb segment.

6. The honeycomb structure according to claim 2, wherein 70% by volume or more of the honeycomb structure is constituted of the honeycomb segment having a sectional area of 900 mm$^2$ to 10000 mm$^2$ in the section of the honeycomb segment.

7. The honeycomb structure according to claim 3, wherein 70% by volume or more of the honeycomb structure is constituted of the honeycomb segment having a sectional area of 900 mm$^2$ to 10000 mm$^2$ in the section of the honeycomb segment.

8. The honeycomb structure according to claim 4, wherein 70% by volume or more of the honeycomb structure is constituted of the honeycomb segment having a sectional area of 900 mm$^2$ to 10000 mm$^2$ in the section of the honeycomb segment.

9. The honeycomb structure according to claim 1, wherein openings of predetermined cells in the honeycomb segments are plugged in one end face, and the openings of a part of remaining cells are plugged in the other end face.

10. The honeycomb structure according to claim 2, wherein openings of predetermined cells in the honeycomb segments are plugged in one end face, and the openings of a part of remaining cells are plugged in the other end face.

11. The honeycomb structure according to claim 3, wherein openings of predetermined cells in the honeycomb segments are plugged in one face, and the openings of a part of remaining cells are plugged in the other end face.

12. The honeycomb structure according to claim 8, wherein openings of predetermined cells in the honeycomb segments are plugged in one end face, and the openings of a part of remaining cells are plugged in the other end face.

13. The honeycomb structure according to claim 1, wherein the openings of the predetermined cells in the honeycomb segments are plugged in one end face, and the openings of all the remaining cells are plugged in the other end face.

14. The honeycomb structure according to claim 5, wherein the openings of the predetermined cells in the honeycomb segments are plugged in one end face, and the openings of all the remaining cells are plugged in the other end face.

15. The honeycomb structure according to claim 6, wherein the openings of the predetermined cells in the honeycomb segments are plugged in one end face, and the openings of all the remaining cells are plugged in the other end face.

16. The honeycomb structure according to claim 8, wherein the openings of the predetermined cells in the honeycomb segments are plugged in one end face, and the openings of all the remaining cells are plugged in the other end face.

17. The honeycomb structure according to claim 1, wherein adjacent honeycomb segments are adjoined at an outer peripheral wall of each segment such that each adjoined honeycomb segment includes at least one additional outer peripheral wall that is at a 90° angle with respect to the adjoining outer peripheral walls of the adjoined honeycomb segments, the at least one additional outer peripheral wall of each adjoined honeycomb segment being aligned with and parallel to each other.

18. The honeycomb structure according to claim 17, wherein the adjacent honeycomb segments are in a central portion of the honeycomb structure such that none of the outer peripheral walls of either honeycomb segment forms any part of the outermost peripheral wall of the honeycomb structure, and wherein each adjacent honeycomb segment includes second additional outer peripheral walls on sides opposite each segment from the first additional outer peripheral walls, the second additional outer peripheral walls also being at a 90° angle with respect to the adjoining outer peripheral walls of the adjoined honeycomb segments, the second outer peripheral walls of each adjoined honeycomb segment being aligned with and parallel to each other.

* * * * *